United States Patent [19]

Walsh et al.

[11] Patent Number: 4,583,399
[45] Date of Patent: Apr. 22, 1986

[54] PRECIPITATION GAUGE

[76] Inventors: John E. Walsh, Box, Bradford, Vt. 05033; James R. Longacre, 3621 Littledde Rd., Kensington, Md. 20795

[21] Appl. No.: 712,210
[22] Filed: Mar. 15, 1985
[51] Int. Cl.⁴ .................................. G01W 1/14
[52] U.S. Cl. ........................ 73/171; 73/73; 73/170 R
[58] Field of Search ......... 73/73, 171, 170 R, 432 CR

[56] References Cited

U.S. PATENT DOCUMENTS

| 1,236,381 | 8/1917 | Rogers | 73/171 |
| 2,492,768 | 12/1949 | Schaefer | 73/170 R |
| 4,531,087 | 7/1985 | Larson | 73/73 |

FOREIGN PATENT DOCUMENTS

| 845073 | 4/1979 | U.S.S.R. | 73/73 |
| 855465 | 8/1981 | U.S.S.R. | 73/73 |

*Primary Examiner*—Charles Frankfort
*Assistant Examiner*—Denis E. Corr
*Attorney, Agent, or Firm*—Cushman, Darby & Cushman

[57] ABSTRACT

A precipitation gauge in which precipitation is absorbed by a suitable material having two pairs of grids also disposed therein to form two capacitances. An ac signal is applied to the grids to measure the impedance between the grids and hence the volume of precipitation absorbed.

11 Claims, 8 Drawing Figures

PRECIPITATION GAUGE

BACKGROUND AND SUMMARY OF THE INVENTION

The invention relates to an apparatus for measuring moisture conditions, more particularly for measuring the quantity of precipitation such as rain or snow which has fallen to the earth and the subsequent rate of evaporation of that precipitation.

Precise knowledge of the amount of precipitation which falls to the ground at various places in a region is becoming increasingly important. Such knowledge permits accurate prediction of future crops and a rational scheduling of irrigation and other watershed management. In addition, such information is vital in managing water resources to avoid waste and flooding.

The rate of precipitation, typically the amount of rainfall which falls to the ground in a given time period, is now measured by conventional rain gauges utilizing tipping buckets. Water falls first into a small bucket which empties into a larger bucket when the smaller bucket holds a given quantity of liquid. The larger bucket in turn tips into a yet larger bucket when full. In this way the amount of rainfall can be ascertained and even transmitted to some remote location.

The disadvantages of such rain gauges are well known. First, the amount of liquid which causes tipping of a given bucket may vary from apparatus to apparatus, particularly as the device weathers and maybe even partially damaged by the elements. Second, the devices are mechanically complicated and apt to failure. Third, the mechanical complexity of the devices results in a cost which is too high to permit use of the number of devices desired for most applications.

The present invention relates to a simple rain gauge which also has the capability of measuring other moisture conditions and which contains no moving parts. Precipitation is received within an open container having therein an absorbant material which absorbs the rainfall and has a dielectric constant varying as a function of the volume of precipitation absorbed. Conductors extend in the media, preferably forming two pairs of separated grids. An ac signal is applied to the grids at least periodically to measure the impedance between the grids and thereby the dielectric constant of the media and the volume of precipitation absorbed. Measurement in this fashion is discussed further in the patent to Walsh U.S. Pat. No. 4,288,742 and in application Ser. Nos. 623,230 filed June 21, 1983 and U.S. Pat. No. 416,232 filed Sept. 7, 1982, the disclosures of which are hereby incorporated by reference.

A heater can also be disposed within the container for drying the absorbant material either periodically or when a rainstorm or snowstorm has stopped. A plurality of different media having different absortivity can be disposed either to receive precipitation simultaneously or from an absorbant media located above it to indicate the amount of precipitation received in different time periods. The container may have an upper open portion above the absorbant medium with a heater disposed therein for melting snow to provide an accurate and continuous indication of the precipitation received in a snowstorm.

A sensor such as a pair of contacts disposed in a groove on the top of the container may be utilized to indicate when a rainstorm has ceased and a measurement of the amount of precipitation received during that rainstorm can be taken.

DETAILED DESCRIPTION OF THE DRAWINGS

Figure 1:
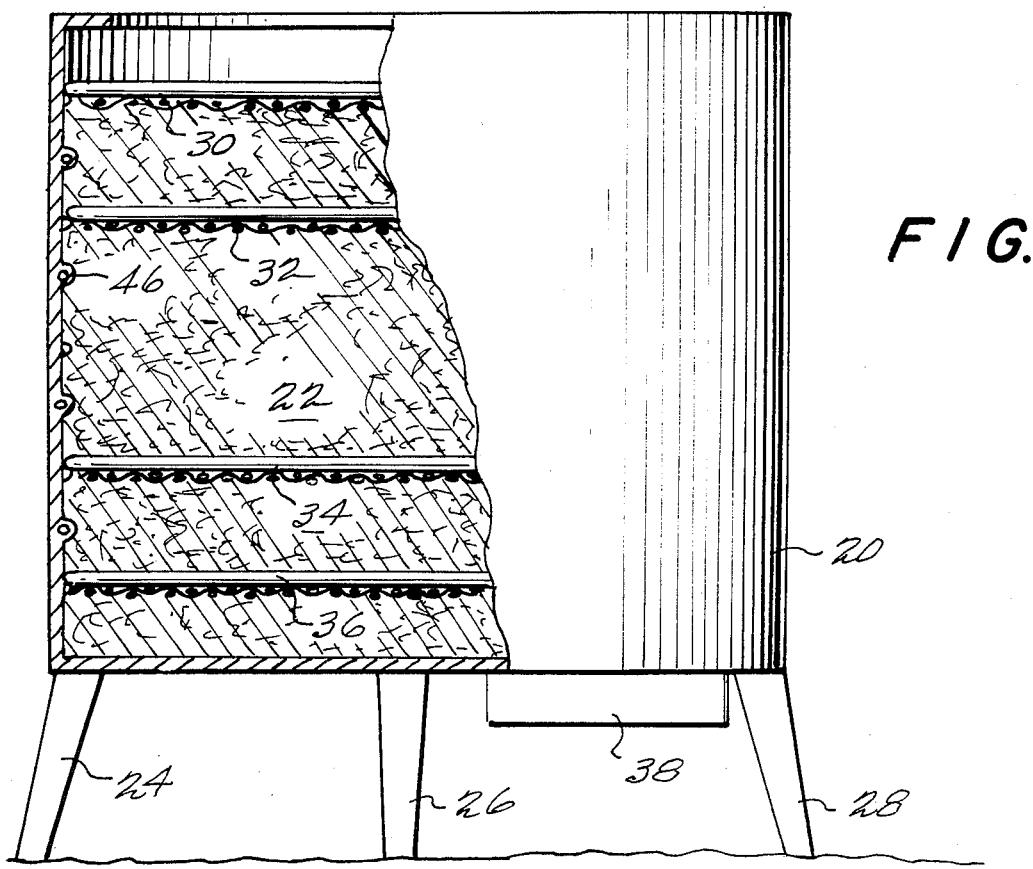
FIG. 1 shows a partial sectional view of a first embodiment of the present invention.
Figure 2:
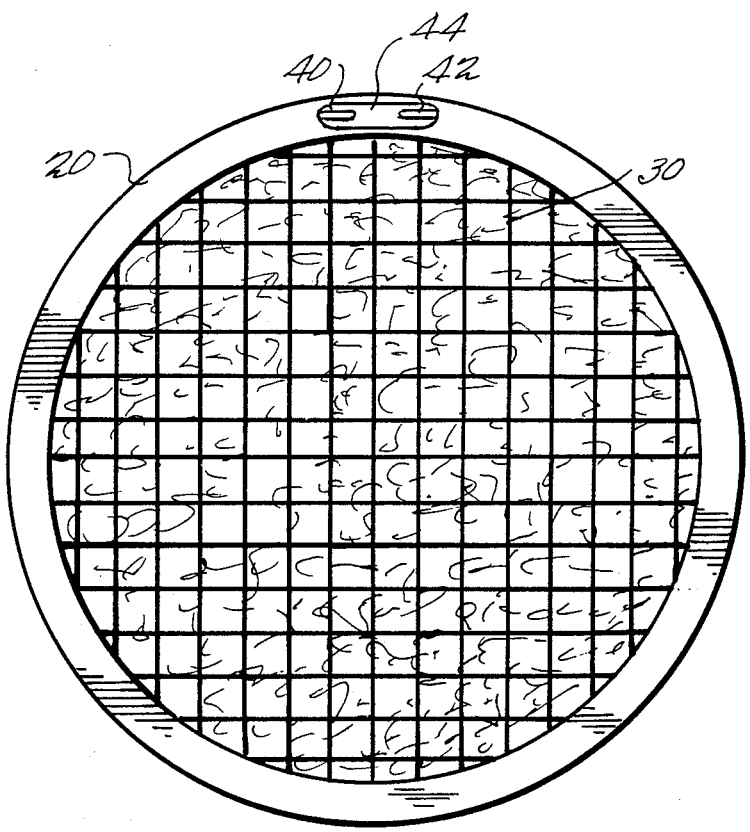
FIG. 2 shows a top view of the embodiment of FIG. 1.

Reference is now made to FIGS. 1 and 2 which illustrate a first embodiment of the invention. A cylindircal container 20, for example of a non-conductive material such as a suitable plastic, contains an absorbant media 22 such as the spongy material commonly used for known porosity filters and the like. Container 20 has an open top into which precipitation, including snow and rain, falls. Any absorbant material having a dielectric constant which varies in a reproducible manner as a function of the moisture content thereof can be used for the absorbant material. Container 20 sits on a tripod of legs 24, 26, and 28 for measuring the amount of rain or other precipitation which is received within any given time period. Two pairs of grids of conductors 30, 32, 34 and 36 are disposed vertically separated from each other and mounted electrically insulated from each other in container 20. Preferably each of the grids is formed of thin wires electrically connected together and extending transversely one to the other. The respective grids define two open capacitors, one capacitor being formed between grids 30 and 32 and a second between grids 34 and 36. The use of two capacitors in this fashion enhances sensitivity and, in addition, provides a ready indication when the moisture has been evenly distributed within absorbant media 22.

The two capacitors are connected in a bridge circuit, as shown in detail in FIG. 8 and discussed in detail below. The bridge circuit and associated elements are mounted in a case 38 below container 20. An oscillator circuit supplies a signal at a frequency which varies a function of the capacitance and thus the water content of absorbant media 22.

Of course, evaporation will occur continuously from the open top of the container 20. During a rainstorm the amount of evaporation will be essentially zero. Once the storm stops, howver, the rate of evaporation increases substantially. For certain systems it will be useful to ascertain after each amount of rainfall the amount of precipitation which has occurred. This can be done by sensing when rain has stopped and then operating the circuit to measure the dielectric constant of the absorbant media with the water therein.

FIG. 2 illustrates a suitable sensor for indicating when rainfall has ceased. A pair of conductors 40 and 42 are disposed in a shallow groove 44 formed in the lip of the upper surface of container 20. During a rainstorm and for a time thereafter water in groove 44 electrically connects together the two contacts 40 and 42. When water in groove 44 has evaporated, contacts 40 and 42 become electrically insulated one from the other which condition can be readily detected to indicate that a measurement should be taken.

In addition, a simple resistive coil 46 is provided around the inside periphery of container 20. Coil 40 can be supplied with electricity to heat media 22 and drive off any moisture after measurement in preparation for measuring the water content of a second rainstorm. A low power microwave heater of the type used in single cup coffee makers can be alternatively used.

Figure 3:
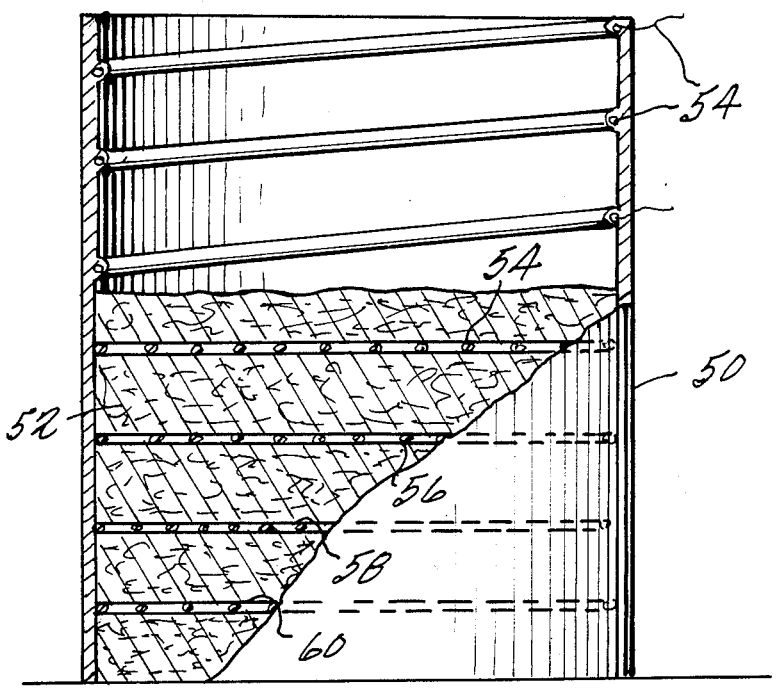
FIG. 3 shows a sectional view of a second embodiment of the invention for measuring precipitation in snow.

Reference is now made to FIG. 3 which illustrates a second embodiment of the present invention likewise employing a container 50 open at the top and having an absorbant media 52 therein of the type described above. Grids 54, 56, 58 and 60 are disposed within container 50 for measuring the moisture content of precipitation which has fallen therein. The arrangement of FIG. 3, however, is particularly designed for measuring the moisture content of fallen snow. The snow falls into the open top of container 50 and is melted therein by a resistive coil 54 which may be operated either continuously or periodically during a snowstorm.

Figure 4:
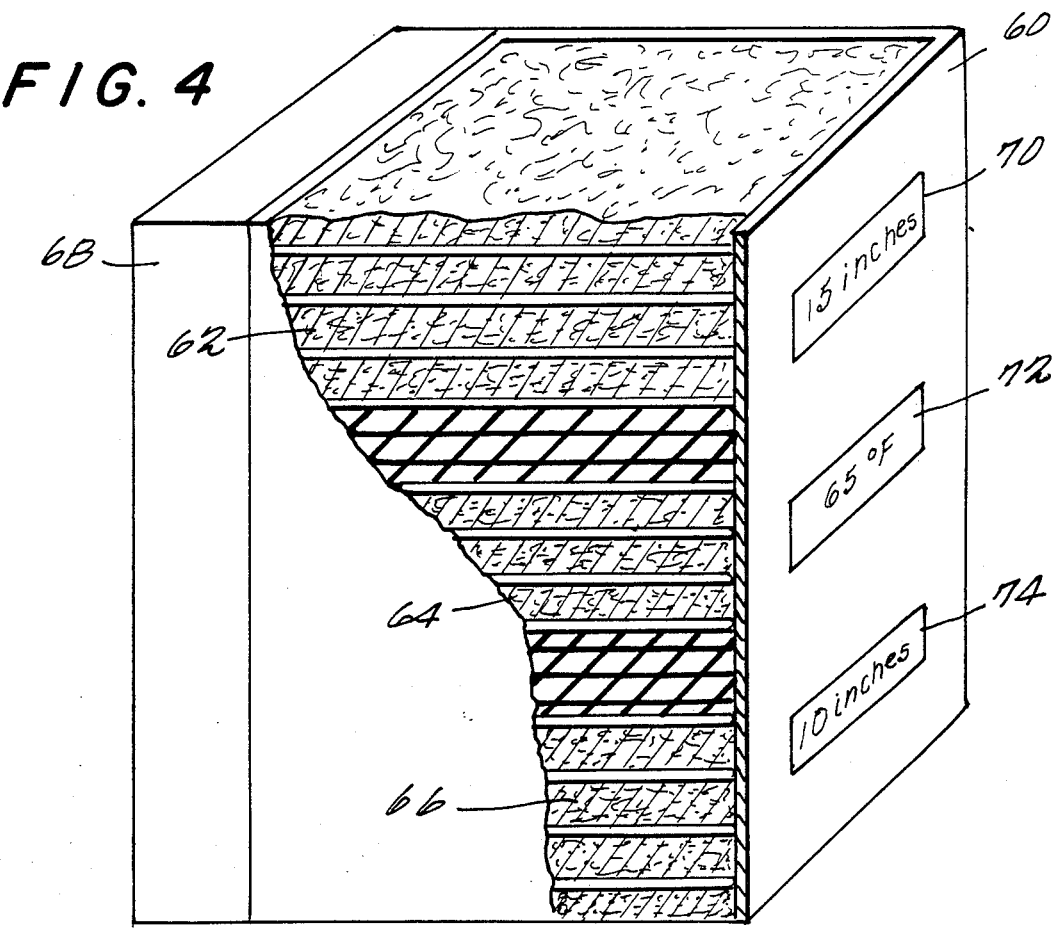
FIG. 4 shows a third embodiment of the invention in which a plurality of different media having different absorbtion rates are disposed one above the other.

FIG. 4 illustrates another embodiment of the present invention in which three types of absorbant material, each more absorbant than the one above it, are stacked one above the other within an open container 60. A set of grids is mounted within each of the respective absorbant media 62, 64 and 66. Suitable electronics for controlling the operation of the rain gauge, as described in general above, are provided in a portion 68 of container 60 to the side of absorbant media 62, 64 and 66. Precipitation is first received and absorbed by the media 62 until it becomes saturated at which point the liquid seeps into the second media 64. When that media becomes saturated the moisture then seeps into the final media 66. Thus the device operates in a fashion like that of the tipping bucket rain gauge. First, media 66 indicates a small amount of precipitation, the media 64 a larger amount and the media 66 a much larger amount.

Displays 70, 72 and 74 are provided on container 60 for indicating, respectively, the amount of precipitation which has fallen within some given period, for example 24 hours, the temperature of the air or the soil and the rate of evaporation of moisture from the media. If the media is chosen to have characteristics similar to that of the soil, then the rate of evaporation indicated will be close to that of evaporation from the surrounding soil.

Figure 5:
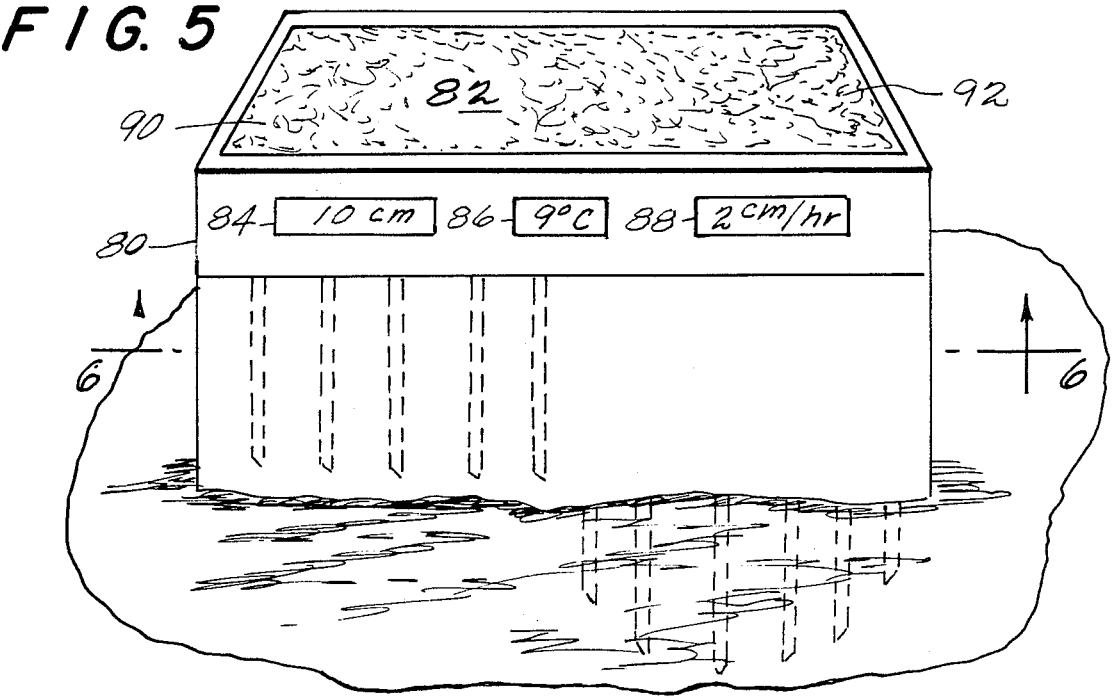
FIGS. 5 and 6 show a fourth embodiment of the invention with conductive spines in one part thereof extending into the ground for indicating the evaporation rate of moisture from the ground and the moisture content of the soil.
Figure 6:
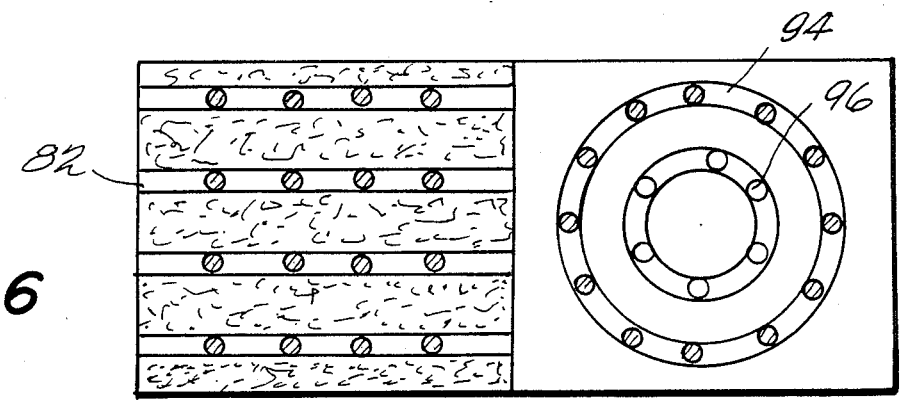

FIGS. 5 and 6 illustrate yet another embodiment of the present invention. In this arrangement four rows of spikes are connected together electrically to form two capacitances in the same way as described above. The spikes extend in a suitable container 80 open at the top and filled with a suitable absorbant media 82. Displays 84, 86 and 88 as indicated above respectively display the rainfall within some given past time period, the temperature of the air or of the soil and the rate of evaporation from the absorbant material or the soil.

Container 80 is formed with a first chamber 90 containing the absorbant material and a second chamber 92 which is empty and which permits the precipitation to fall through and be absorbed by the ground underneath. Two rings of spikes 94 and 96, respectively, extend downwardly from supporting rings in the second chamber and into the ground for indicating both the moisture content of the soil and the rate of evaporation thereof. This arrangement is as described in U.S. Pat. No. 4,288,742.

Figure 7:
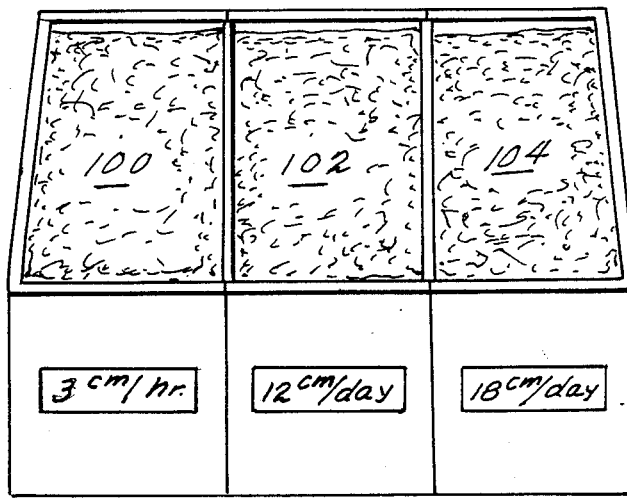
FIG. 7 shows a fifth embodiment of the present invention in which absorbant media having different absortivity are disposed beside each other for indicating the amount of precipitation received in different periods of time.

FIG. 7 illustrates yet another embodiment of the invention in which media 100, 102 and 104 of different absortivity are disposed in container 106 so that each receives precipitation at the same time. The different absorbant media can therefore be used for indicating the rate of precipitation or the rate of evaporation during different time periods, for example, per day, per hour and per week.

Figure 8:
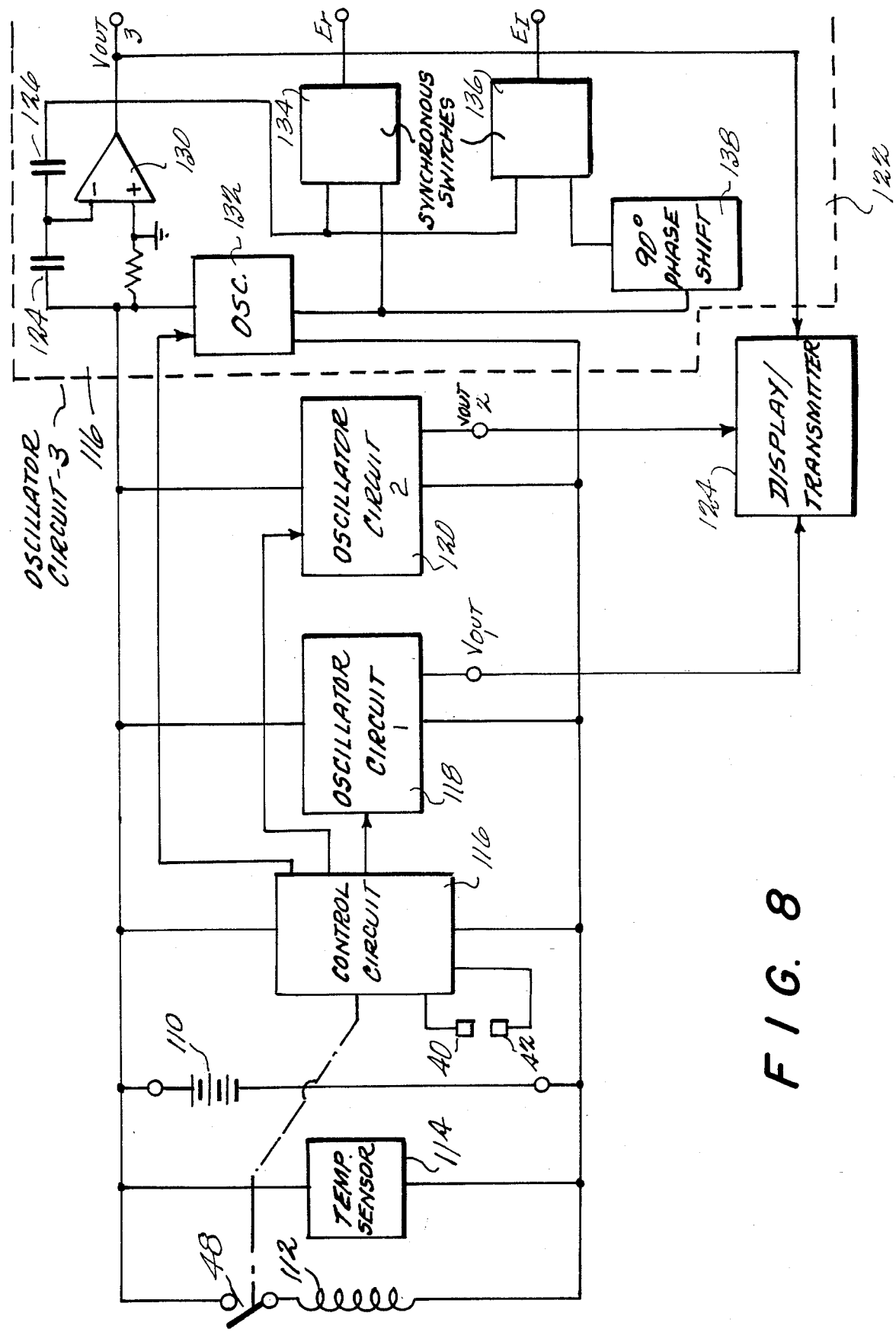
FIG. 8 shows a control circuit for the present invention.

Finally, FIG. 8 illustratess a suitable control circuit for the present invention. Power for the device is preferably provided by a battery 110 which is connected to heating coil 44 which is operated by a conventional control circuit 116 such as a suitable microprocessor by closing switch 112. Temperature sensor 114 indicates soil or air temperature. Control circuit 116 is connected to sensors 40 and 42 for indicating when a rain shower has stopped and a measurement can be taken or the rate of evaporation determined. Control circuit 116 controls several oscillator circuits 118, 120 and 122 which control respective moisture sensors, for example of the type shown in FIGS. 3-7. Each of the oscillator circuits is connected to a suitable display and to remote transmitter 118 which can transmit information for processing at a remote site.

In the circuitry of FIG. 8, each oscillator circuit 118, 120 and 122 is a capacitive divider read-out circuit in which the two capacitors 129 and 126 are connected to a high gain operational amplifier 130. A suitable oscillator 132 provides an alternating current signal at a suitable frequency which is applied to the positive input to operational amplifier 130 while the negative input is connected to the junction between capacitors 124 and 126. The serially connected capacitors bridge the positive input to operational amplifier 130 and the output thereof. The output of operational amplifier 130 thereby indicates the ratio of the capacitances. Switches 134 and 136 provide outputs respectively indicating the resistive and capacitive portions of the output. Oscillator 132 is connected to switches 134 and 136 directly and through phase shifter 138. The circuit will produce an accurate output even if the material has a complex dielectric function.

In materials where the resistance is very large, it may be possible to ignore the resistance value and accordingly only the resonant frequency would need to be measured. In such an application, it may also be desirable to add another resistance and capacitance in parallel with the capacitance and resistance provided by the material to provide wider control of the operating frequency. As an alternative to utilizing a separate oscillator, a conventional Wien bridge oscillator can be utilized in such circumstances where resistance can be ignored. By variation of the frequency, a considerable range of frequencies can be examined to accurately determine the dispersive properties of the material.

Many changes and modifications in the above described embodiment of the invention can, of course, be made without departing from the scope thereof. Accordingly, that scope is intended to be limited only by the scope of the appended claims.

What is claimed is:

1. Apparatus for measuring the rate of precipitation comprising:

container means defining a container open at the top for receiving precipitation;

absorbent media within said container means for absorbing rainfall falling into said container and having a dielectric constant varying as a function of the volume of precipitation absorbed;

at least first and second conductive means extending in said media; and circuit means connected to said first and second conductive means for applying an ac signal thereto to measure the impedance between said first and second conductive means and thereby the dielectric constant of such media and the volume of precipitation absorbed and means for determining the rate of precipitation from said impedance.

2. Apparatus as in claim 1 further including heater means disposed within said container means for drying said absorbent material.

3. Apparatus as in claim 2 further including means for detecting when rainfall has stopped and control means for operating said heating means only when said detecting means indicates rainfall has stopped.

4. Apparatus as in claim 3 wherein said container means includes a groove on the top side thereof which fills with water during rainfall and from which water evaporates after rainfall and wherein said detecting means includes first and second electrical contacts mounted separated in said groove so that said contacts are electrically connected together by the water in said groove and electrically separated when the water has evaporated, thus indicating that rainfall has stopped.

5. Apparatus as in claim 1 wherein said absorbent media includes media in a first portion of said container means of a first absortivity and media in a second portion of said container of a second absortivity.

6. Apparatus as in claim 5 wherein said first and second portions are side-by-side for each receiving said precipitation directly.

7. Apparatus as in claim 5 wherein said fist and second portion disposed with said first portion atop said second portion for receiving said precipitation from said second portion.

8. Apparatus as in claim 1 further includes means for detecting and indicating the temperature.

9. Apparatus as in claim 1 wherein said container means is of non-conductive plastic.

10. Apparatus as in claim 1 further including display means on the exterior of said container means for displaying the determined rate of precipitation.

11. Apparatus as in claim 1 further including means for transmitting a signal indicating the determined rate of precipitation to a remote site.

* * * * *